(12) United States Patent
Crow, Jr.

(10) Patent No.: US 6,409,187 B1
(45) Date of Patent: Jun. 25, 2002

(54) BRAKE SYSTEM FOR A CART

(75) Inventor: Harvey L. Crow, Jr., Evansville, IN (US)

(73) Assignee: FKI Industries Inc., Fairfield, CT (US)

( * ) Notice: Subject to any disclaimer, the term of this patent is extended or adjusted under 35 U.S.C. 154(b) by 0 days.

(21) Appl. No.: 09/450,455

(22) Filed: Nov. 29, 1999

(51) Int. Cl.$^7$ .............................................. B62B 5/04
(52) U.S. Cl. ..................... 280/47.34; 188/20; 188/29
(58) Field of Search .................. 280/33.994, 47.35, 280/47.34; 188/20, 29, 57, 19, 1.12; 16/35 R

(56) References Cited

U.S. PATENT DOCUMENTS

| | | | | |
|---|---|---|---|---|
| 1,959,229 A | * | 5/1934 | Carter ..................... | 280/87.01 |
| 2,169,781 A | | 8/1939 | Abresch ..................... | 188/119 |
| 2,430,629 A | | 11/1947 | Bigus, Jr. ..................... | 188/20 |
| 2,864,465 A | * | 12/1958 | Welsh et al. ................... | 188/20 |
| 3,057,638 A | | 10/1962 | Floyd ......................... | 280/79.2 |
| 3,276,550 A | * | 10/1966 | Honeyman ................... | 188/29 |
| 3,651,894 A | | 3/1972 | Auriemma ................... | 188/19 |
| 3,701,396 A | | 10/1972 | House ......................... | 188/21 |
| 3,951,426 A | | 4/1976 | Shaffer et al. ................ | 280/47 |
| 4,134,599 A | * | 1/1979 | DeMille et al. ............... | 188/29 |
| 4,384,713 A | | 5/1983 | Deutsch et al. ............. | 272/70.3 |
| 4,526,253 A | | 7/1985 | Schmidt ..................... | 188/1.12 |
| 4,793,445 A | | 12/1988 | Collignon et al. ............. | 188/29 |
| 4,815,161 A | | 3/1989 | Timmer et al. ................ | 16/35 |
| 4,840,388 A | * | 6/1989 | Doughty ................ | 280/33.994 |
| 4,976,447 A | | 12/1990 | Batson ................... | 280/33.994 |
| 5,090,517 A | | 2/1992 | Doughty ..................... | 188/19 |
| 5,205,381 A | | 4/1993 | Mehmen ..................... | 188/19 |
| 5,288,089 A | | 2/1994 | Bowers et al. .......... | 280/33.994 |
| 5,323,879 A | | 6/1994 | Poulin ......................... | 188/19 |
| 5,325,938 A | | 7/1994 | King ............................ | 188/19 |
| 5,390,942 A | * | 2/1995 | Schuster et al. ........ | 280/33.994 |
| 5,499,697 A | | 3/1996 | Trimble et al. ................ | 188/19 |
| 5,524,731 A | | 6/1996 | Grieg ........................... | 188/19 |
| 5,531,295 A | * | 7/1996 | Kopman et al. ............. | 188/2 D |
| 5,735,367 A | * | 4/1998 | Brubaker ................... | 188/1.12 |
| 5,799,959 A | * | 9/1998 | Krawczyk .................. | 188/1.12 |

FOREIGN PATENT DOCUMENTS

AT 258130 * 11/1967 .............. 280/47.34

* cited by examiner

*Primary Examiner*—Douglas Hess
*Assistant Examiner*—Ed Gort
(74) *Attorney, Agent, or Firm*—Woodard, Emhardt, Naughton Moriarty & McNett

(57) ABSTRACT

A brake system for a movable cart, such as a tool cart or the like, including a brake mechanism for inhibiting rotation of at least one wheel of the cart, a brake release mechanism, and an actuator for manually actuating the brake release mechanism. The brake mechanism includes a lever arm pivotally coupled to the cart and having first and second portions disposed on opposite sides of a pivot axis. The lever arm has a braked position wherein the first portion is pressure-loaded against the cart wheel to inhibit rotation of the wheel. The brake release mechanism includes a cam member rotatably coupled to the frame and disposed adjacent the second portion of the lever arm. The actuator is operatively coupled to the cam member, such that actuation of the actuator rotates the cam member and causes the cam member to engage the second portion of the lever arm and pivots the lever arm to a released position wherein the first portion of the lever arm is disengaged from the cart wheel to permit rotation of the wheel. In a further aspect of the invention, the brake system is configured to provide simultaneously braking of a pair of cart wheels.

24 Claims, 3 Drawing Sheets

BRAKE SYSTEM FOR A CART

BACKGROUND OF THE INVENTION

The present invention relates generally to wheeled carts, such as a tool cart or the like, and more particularly to a brake system for arresting mobility of a cart and preventing indiscriminate rolling when left unattended.

User-propelled wheeled carts may present a hazard by becoming self-propelled when left unattended. The likelihood and magnitude of the hazard are increased when the cart is heavily loaded or positioned on an incline. To avoid potential damage which may result from inadvertent rolling, prior cart designs have included a braking device which secures and arrests the mobility of the cart when engaged, but which can be conveniently disengaged by the user when a need arises for the cart to be conveyed. One type of such a braking device is sometimes referred to as a "dead-man" switch.

The prior art has failed to produce a commercially acceptable braking mechanism or "dead-man" switch which provides safe and effective braking for wheeled carts, particularly tool carts. Prior braking mechanisms have taken on either a manually or automatically locking configuration. Manual braking systems are constructed in such a way that each wheel or caster is outfitted with its own self-contained braking mechanism, each being actuated and released from the individual wheel locations. In a manual system, the user must inconveniently move around the cart in order to actuate/release the individual braking mechanisms. Such a requirement is inefficient, cumbersome and time consuming, as well as presenting difficulties if the cart is positioned on an incline. The automatic braking systems typically employ a spring to engage or lock one or more of the cart wheels to arrest mobility. A manual brake actuator, usually a brake handle, is sometimes used to toggle between engaged and unengaged braking positions. Prior automatic braking systems exhibit certain drawbacks, including high cost and complexity, as well as being difficult to install, operate and maintain.

Machine shops or mechanical service shops commonly utilize tool storage cabinets or carts which include wheels or casters to allow the cart to be easily moved about the shop floor from job to job. These tool carts are often very heavy, commonly weighing over 300 pounds, and typically have a wheel or caster positioned at each corner of the cart. For such tool carts to be of practical use, they must be readily mobile and possess the ability to quickly and effortlessly overcome the momentum of the tool cart once the cart is positioned in a desired location, while also preventing inadvertent movement of the cart when left unattended.

The present invention attempts to remedy the inconveniences and drawbacks of prior braking mechanisms. The present invention provides a novel and unobvious brake system that can apply braking pressure to at least one cart wheel to arrest or inhibit movement of the cart, while allowing the operator to release the braking pressure when movement of the cart is desired.

SUMMARY OF THE INVENTION

The present invention relates generally to a brake system for a cart, such as a tool cart or the like. While the nature of the invention covered herein is to be determined with reference to the claims appended hereto, certain forms of the invention that are characteristic of the preferred embodiment are described briefly as follows.

According to one embodiment of the present invention, a cart includes a frame, at least two wheels attached to the frame, a braking mechanism, a brake release mechanism, and an actuator for actuating the brake release mechanism. The brake mechanism includes a lever arm coupled to the frame to allow pivotal movement about a pivot axis, with first and second portions of the lever arm disposed on opposite sides of the pivot axis. The lever arm has a braked position wherein the first portion is pressure-loaded against one of the cart wheels. The brake release mechanism includes a cam member coupled to the frame and disposed adjacent the second portion of said lever arm. The actuator is attached to the frame and is coupled to the cam member, such that actuation of the actuator rotates the cam member and causes the cam member to engage the second portion of the lever arm and pivots the lever arm to a released position wherein the first portion of the lever arm is disengaged from the cart wheel.

One object of the present invention is to provide a brake system for a wheeled cart that can apply sufficient braking pressure to at least one wheel to arrest or inhibit movement of the cart, while allowing the operator to release the braking pressure when movement of the cart is desired.

Related objects and advantages of the present invention will be apparent from the following description.

DESCRIPTION OF THE ILLUSTRATED EMBODIMENT

Figure 1:
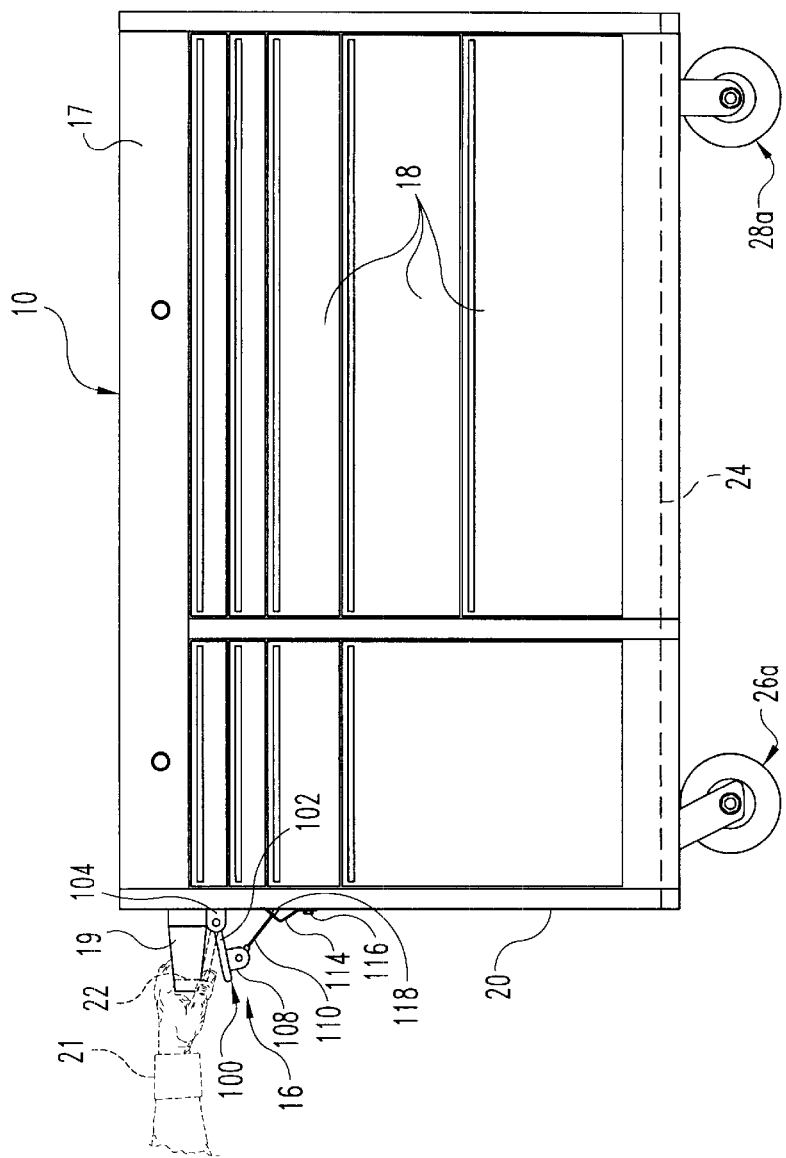
FIG. 1 is a side elevation view of a tool cart, utilizing a brake system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is hereby intended, such alterations and further modifications in the illustrated device, and such further applications of the principles of the invention as illustrated herein being contemplated as would normally occur to one skilled in the art to which the invention relates.

Figure 2:
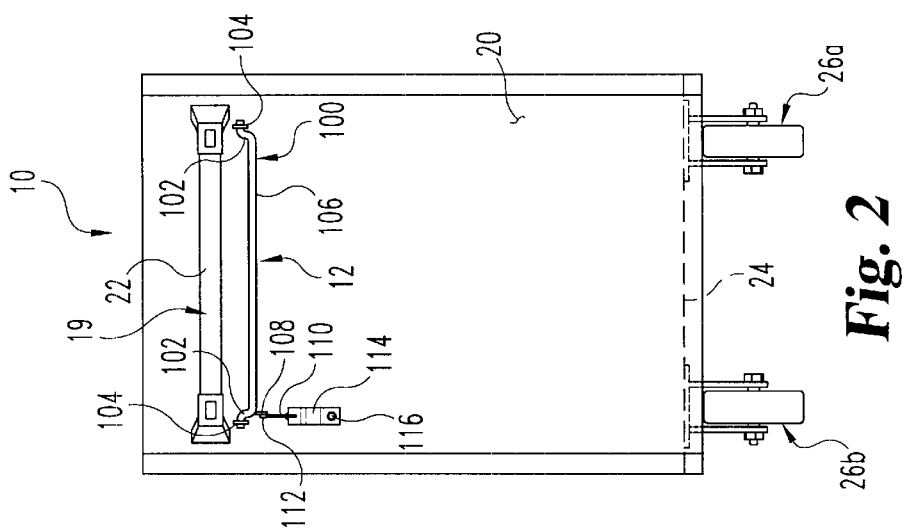
FIG. 2 is an end view of the tool cart depicted in FIG. 1.
Figure 3:
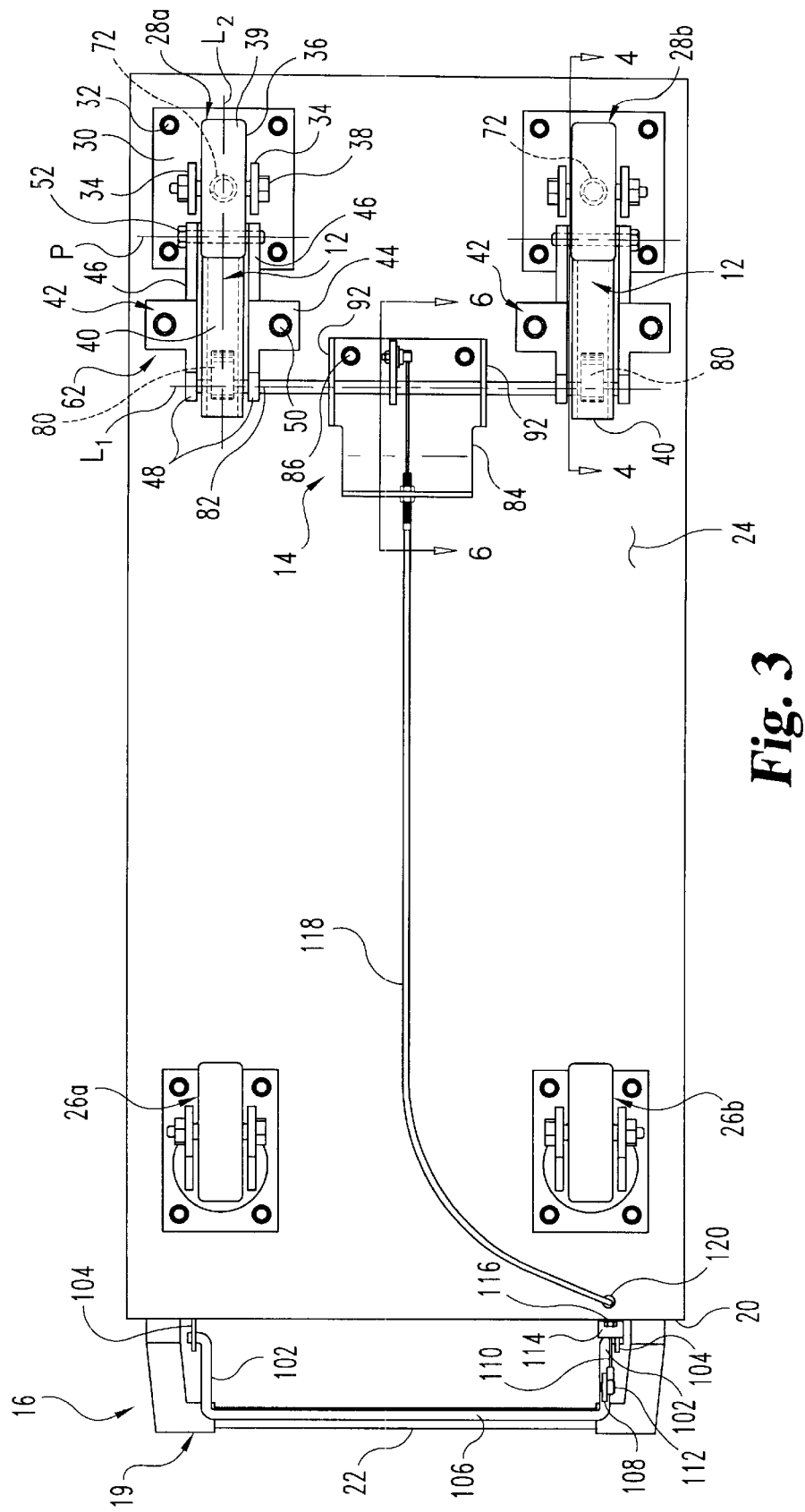
FIG. 3 is a bottom view of the tool cart depicted in FIG. 1.

Referring now to the drawings, a brake system in accordance with the present invention is shown in use with a cart 10, herein illustrated and described as a tool cart. However, those skilled in the art will appreciate that the brake system of the present invention may be used in conjunction with other types of movable carts other than a tool cart. Referring collectively to FIGS. 1–3, the brake system of the present invention is generally comprised of two brake mechanisms 12 associated with two wheels of the cart 10. a brake release mechanism 14 associated with each brake mechanism 12, and an actuator mechanism 16. The actuator mechanism 16 is preferably hand-operated and mounted remote from the brake mechanism 12. The brake mechanisms 12 are normally biased in a braked position to prohibit movement of cart 10. However, through the manual manipulation of the actuator mechanism 16, the cart operator is able to actuate the brake release mechanism 14 and translate the brake mechanisms 12 to a released position so that the cart 10 can be pushed or pulled to a new location. By deactivating the actuator mechanism 16, the brake mechanisms 12 are each allowed to return to the braked position, thus arresting movement of the cart 10 and preventing further movement of cart 10 when left unattended. Further details regarding the operation of the brake system will be discussed more fully below.

The tool cart 10 is primarily used for the storage and transportation of various tools and related devices. To that end, cart 10 has a structural frame 17 that is equipped with a series of drawers 18. A cart handle 19 is attached to a side 20 of frame 17 to facilitate the movement and guiding of cart 10 by an operator 21. A central, graspable portion 22 of cart handle 19 is configured to be easily gripped by the operator 21 to enable the operator 21 to push or pull cart 10 while steering cart 10 in a desired direction. Attached to an underside 24 of frame 17 is a pair of rear, swiveling caster assemblies 26a, 26b and a pair of front, fixed-position caster assemblies 28a, 28b. However, it should be understood that the number and position of the caster assemblies may be varied as would occur to one of ordinary skill in the art. For instance, two fixed-position caster assemblies could be mounted toward the center of underside 24. Also, two fixed-position caster assemblies could be mounted toward one end of underside 24, with a third swiveling caster assembly mounted toward the opposite end of underside 24 and centered between the two fixed-position caster assemblies. An example of a suitable swiveling caster assembly 26a, 26b is manufactured by Faultless Caster, located in Evansville, Ind., under Part No. 26230. An example of a suitable fixed-position caster assembly 28a, 28b is also manufactured by Faultless Caster under Part No. 27466. However, other suitable swiveling and fixed-position (non-swiveling) caster assemblies are also contemplated as would occur to one of ordinary skill in the art.

Referring specifically to FIG. 3, each fixed-position caster assembly 28a, 28b includes a base plate 30, which is mounted to the underside 24 of frame 17 by a plurality of fasteners 32. A pair of mounting flanges 34 extend perpendicularly from base plate 30 and hold a wheel 36 in a rotatable manner via an axle pin or connector 38. Wheel 36 is thus rotatably attached to frame 17 and has a peripheral or circumferential surface 39 that engages the ground.

Figure 4:
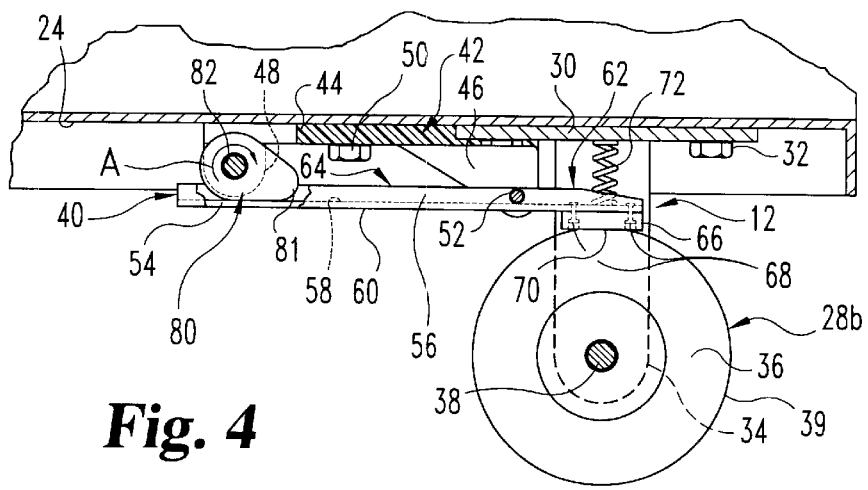
FIG. 4 is a cross sectional view of a portion of the brake system, taken along line 4—4 of FIG. 3, illustrating an engaged position of a braking mechanism.

Referring collectively to FIGS. 3–4, shown therein are details regarding brake mechanism 12. In a preferred embodiment, a brake mechanism 12 is associated with each of the fixed-position caster assemblies 28a, 28b. While a single brake mechanism 12 could be used in association with a single caster wheel, providing dual brake mechanisms provide increased braking power, which is especially useful with heavier tool carts. Also, it avoids swiveling of the cart about a single braked wheel. Because the brake mechanisms 12 are identical, only one of the brake mechanisms 12 will be described. Brake mechanism 12 includes a lever or rocker arm 40 pivotally coupled to the underside 24 of frame 17 by way of a mounting bracket 42. Mounting bracket 42 includes a generally flat base portion 44, a pair of horizontally-spaced forward flanges 46, and a pair of horizontally-spaced rearward flanges 48. Forward and rearward pairs of flanges 46, 48 extend downward from and perpendicular to base portion 44. Mounting bracket 42 is securely mounted to the underside 24 of frame 17 by a plurality of fasteners or bolts 50. Preferably, mounting bracket 42 is fabricated from an easily machinable, light-weight material such as glass-filled nylon.

Lever arm 40 is pivotally mounted to forward flanges 46 by way of a fastener pin or bolt 52, thus allowing lever arm 40 to freely pivot about a pivot axis P (FIG. 3). Lever arm 40 is preferably U-shaped, having a generally flat base portion 54 and a pair of flanges 56 extending perpendicularly therefrom. Base portion 54 has a top surface 58 and an opposite bottom surface 60. Flanges 56 are disposed between the forward flanges 46 of mounting bracket 42, with the fastener pin 52 extending through pairs of flanges 46, 56 and defining pivot axis P. Lever arm 40 has a first portion 62 (FIGS. 4 and 5) disposed on the forward side of pivot axis P, and a second portion 64 disposed on the rearward side of pivot axis P. Preferably, lever arm 40 is fabricated from a standard structural channel made from steel, or any another suitable material.

A brake pad 66, preferably fabricated from vulcanized rubber, is attached to the bottom surface 60 of first portion 62 by a plurality of fasteners 68. Brake pad 66 defines a braking surface 70 that is pressure-loaded against circumferential surface 39 of wheel 36 by way of a biasing member or spring 72. Spring 72 is disposed between base plate 30 of caster assembly 28b and top surface 58 of lever arm portion 62, and is secured to base plate 30 by any method known to one of ordinary skill in the art, such as by welding. Spring 72 biases or urges lever arm 40 into a braked position, wherein braking surface 70 of brake pad 66 frictionally engages circumferential surface 39 to inhibit rotation of wheel 36. In a preferred embodiment, braking surface 70 tangentially engages circumferential surface 39. Although braking surface 70 is illustrated as being generally flat, it should be understood that braking surface 70 could alternatively be contoured complimentary to circumferential surface 39 of wheel 36 to provide an increased area of contact therebetween. It should also be understood that first portion 62 of lever arm 40 could alternatively be configured to engage other portions of caster assembly 28b to inhibit rotation, such as the side of wheel 36 or a surface of axle pin 38.

Although the illustrated embodiment depicts spring 72 as a coil spring, other types of resilient members that are capable of being elastically deformed are also contemplated as would occur of one to ordinary skill in the art. Additionally, although spring 72 is preferably positioned so as to exert a downward force onto forward portion 62 of lever arm 40, it should be understood that spring 72 can alternatively be used to exert an upward force onto rearward portion 64. In either case, brake pad 66 will be normally biased against circumferential surface 39 to inhibit rotation of wheel 36.

A brake release mechanism 14 is associated with each of brake mechanisms 12. Because the brake release mechanisms are identical, only one brake release mechanism 14 will be described. Brake release mechanism 14 includes a cam member 80 rotatably mounted to the underside 24 of frame 17 and disposed adjacent the rearward portion 64 of lever arm 40. More particularly, cam member 80 is coupled to an elongate shaft 82 having a longitudinal axis $L_1$. The shaft is rotatably mounted to underside 24 of frame 17 by mounting brackets 42. In a preferred embodiment, longitudinal axis $L_1$ of shaft 82 and pivot axis P of lever arm 40 are substantially parallel. The end portions of shaft 82 are supported by the rearward flanges 48 of mounting brackets 42. The mid-portion of shaft 82 is supported by a central mounting bracket 84 which is secured to the underside 24 of frame 17 by fasteners 86.

Cam member 80 is securely coupled to shaft 82 by any method known to one of ordinary skill in the art, such as, for example, by a fastener or set screw. Cam member 80 is disposed between opposing rearward flanges 48 of mounting bracket 42 and is positioned adjacent top surface 58 of lever arm 40. One function of cam member 80 is to translate rotational movement of shaft 82 into pivotal movement of lever arm 40, the details of which will become apparent below. In a preferred embodiment, cam member 80 has an eccentric or asymmetrical shape, including an eccentric portion 81. However, other shapes and configurations of cam member 80 are also contemplated as would occur to one of ordinary skill in the art. Preferably, cam member 80 is fabricated from an easily machinable, lightweight material such as glass-filled nylon.

Figure 6:
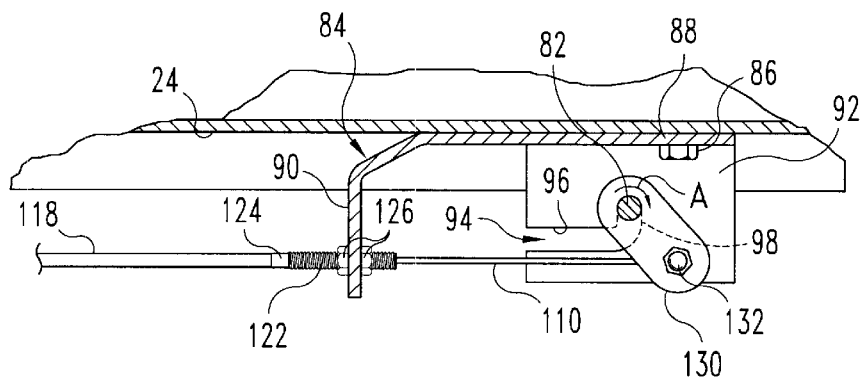
FIG. 6 is a cross sectional view of a portion of the brake system, taken along line 6—6 of FIG. 3.

Referring now to FIG. 6, central mounting bracket 84 is generally L-shaped, having a base portion 88 and a leg portion 90. Base portion 88 is mounted to the underside 24 of frame 17 by fasteners or bolts 86. Mounting bracket 84 also includes a pair of horizontally spaced flanges 92 extending perpendicularly from base portion 88. Opposing flanges 92 each include a slot 94 having a horizontal portion 96 and a vertical portion 98. In a preferred embodiment, the horizontal portions 96 of opposing flanges 92 open in opposite directions (only one flange 92 being shown in FIG. 6). Shaft 82 is mounted to opposing flanges 92 by first inserting shaft 82 through the openings of horizontal portions 96 and rotating shaft 82 into alignment with vertical portions 98, and then vertically displacing shaft 82 toward the end of vertical portions 98.

Referring back to FIGS. 1–2, actuator mechanism 16 is mounted to side 20 of frame 17 directly below cart handle 19. In a preferred embodiment, actuator mechanism 16 includes an actuator handle 100 pivotally mounted to frame 17. Actuator handle 100 is substantially U-shaped, having horizontally-spaced leg portions 102, each extending through a corresponding mounting flange 104, and a central graspable portion 106 extending between leg portions 102. Graspable portion 106 of actuator handle 100 and graspable portion 22 of cart handle 19 are disposed in a substantially parallel arrangement. When actuator handle 100 is pivoted from an initial, deactivated position (shown in solid lines) to an activated position (shown in hidden lines), graspable portions 22, 106 are placed in close proximity to allow the operator 21 to simultaneously grasp each of the graspable portions 22, 106 and selectively maintain the actuator handle 100 in the activated position. Actuator handle 100 also includes a mounting tab 108 extending from one of the leg portions 102, to which is attached a cable 110 by way of a fastener or coupling device 112. Cable 110 passes through a V-shaped guide bracket 114 which is mounted to side 20 of frame 17 by a fastener 116. A cable guide or protector tube 118 is attached to an inner surface of support bracket 114, through which passes cable 110. Notably, cable 110 and cable guide 118 are both aligned at approximately a 45° angle relative to side 20, thus avoiding any undue wearing of cable 110 which might otherwise be caused by passing cable 110 over an edged surface during repeated activation and deactivation of actuator handle 100. Cable 110 and cable guide 118 pass through the interior of frame 17 along side 20, extending downwardly toward the underside 24 of frame 17.

Referring now to FIG. 3, cable 110 and cable guide 118 exit the underside 24 of frame 17 through an opening 120, and are routed along underside 24 towards central mounting bracket 84. Referring to FIG. 6, cable guide 118 is securely attached to leg portion 90 of central mounting bracket 84 by an externally threaded sleeve 122. An unthreaded end portion 124 of sleeve 122 is crimped over cable guide 118 to secure cable guide 118 to sleeve 122. A pair of locknuts 126 are threaded onto sleeve 122 on opposite sides of leg portion 90, thereby securely connecting cable guide 118 to central mounting flange 84.

The end of cable 110 is attached to a torque arm 130 extending from shaft 82 in a direction generally perpendicular to the longitudinal axis $L_1$ by way of a cable fastener or coupler 132. Thus, it can be seen that actuator handle 100 is operatively coupled to shaft 82 such that when actuator handle 100 is pivoted from its deactivated position to its activated position (see FIG. 1), torque arm 130 will be pulled proximally toward leg portion 90, thus rotating shaft 82 about longitudinal axis $L_1$ in the direction of arrow A.

Figure 5:
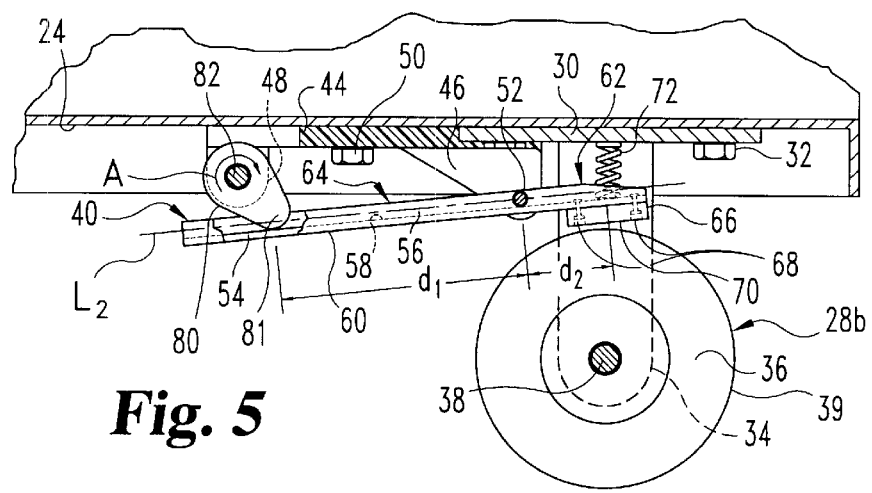
FIG. 5 is a cross sectional view of a portion of the brake system, illustrating a disengaged position of the braking mechanism depicted in FIG. 4.

Referring now to FIG. 5, the rotation of shaft 82 in response to the actuation of actuator handle 100 correspondingly rotates cam member 80 in the direction of arrow A. The rotation of cam member 80 causes eccentric portion 81 to engage and bear upon top surface 58 of rearward portion 64 of lever arm 40. The rotational movement of cam member 80 consequently imparts pivoting or rocking movement to lever arm 40. The downward force exerted by cam member 80 onto the rearward portion 64 of lever arm 40 pivots lever arm 40 to a released position. In this released position, braking surface 70 of brake pad 66 is disengaged from the circumferential surface 39 of wheel 36, thereby permitting wheel 36 to freely rotate. It should be apparent that the pivotal movement of lever arm 40 towards its released position is opposed by the downward biasing force exerted by spring 72 onto forward portion 62 of lever arm 40.

In a preferred embodiment of the present invention, the biasing force exerted by spring 72 is maximized in order to provide sufficient braking engagement between brake pad 66 and wheel 36 when lever arm 40 is in its normal braked position. Consequently, the amount of force cam member 80 must exert onto rearward portion 64 of lever arm 40 to pivot lever arm 40 to its released position is correspondingly increased. The mechanical advantage inherent in lever arm 40 minimizes the negative effects which might otherwise result from increasing the biasing force of spring 72, such as premature wear or breakage of various brake system components. Lever arm 40 defines a longitudinal axis $L_2$ oriented substantially perpendicular to pivot axis P. A first longitudinal distance $d_1$ separates pivot axis P from an area of contact between the eccentric portion 81 of cam member 80 and rearward portion 64 of lever arm 40. A second longitudinal distance $d_2$ separates pivot axis P from an area of contact between spring 72 and forward portion 62 of lever arm 40. By providing lever arm 40 with a first longitudinal distance $d_1$ which is greater than the second longitudinal distance $d_2$, mechanical advantage can be gained, thus reducing the amount of force cam member 80 must exert onto rearward portion 64 to pivot lever arm 40 to its released position. In a preferred embodiment, the first longitudinal distance $d_1$ is at least twice that of the second longitudinal distance $d_2$.

In operation, as shown in FIG. 4, braking mechanism 12 has a first operational position wherein braking surface 70 of brake pad 66 is pressure-loaded or biased against the circumferential surface 39 of wheel 36 to inhibit rotation of wheel 36. In this first operational position, cart 10 will be maintained in a stationary position, thereby preventing inadvertent or unexpected rolling. However, as shown in FIG. 5, by pivoting actuator handle 100 to an activated position (see FIG. 1), brake release mechanism 14 will translate brake mechanism 12 to a second operational position wherein brake pad 66 is disengaged from wheel 36 to permit wheel 36 to freely rotate, thus allowing cart 10 to be pushed or pulled to a new location. Once cart 10 is positioned in a desired location, actuator handle 100 is released, and the biasing force exerted by spring 72 will cause brake mechanism 12 to return to its first operational position wherein brake pad 66 will re-engage wheel 36 to once again inhibit the rotation of wheel 36. Thus, the release of actuator handle 100 will arrest the mobility of cart 10 if in motion, or will prevent inadvertent movement of cart 10 if stationary.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A movable cart, comprising:
   a frame;
   at least two wheels rotatably attached to said frame;
   a brake mechanism including a lever arm pivotally coupled to said frame to allow pivotal movement of said lever arm about a pivot axis, said lever arm being disposed in a substantially horizontal orientation and having first and second portions disposed on opposite sides of said pivot axis, said lever arm having a braked position wherein said first portion is pressure-loaded against one of said wheels to inhibit rotation thereof;
   a brake release mechanism including a cam member rotatably coupled to said frame and disposed adjacent said second portion of said lever arm;
   an actuator attached to said frame and being operatively coupled to said cam member; and
   wherein actuation of said actuator imparts rotational movement to said cam member, said rotational movement causing said cam member to engage said second portion of said lever arm and pivot said lever arm to a released position wherein said first portion of said lever arm is disengaged from said one of said wheels to permit rotation thereof.

2. The cart of claim 1, wherein said brake mechanism includes a biasing member engaged between said frame and said lever arm to urge said lever arm toward said braked position.

3. The cart of claim 2, wherein said biasing member is a spring, said spring being disposed between an underside of said frame and an upper side of said first portion of said lever arm.

4. The cart of claim 3, wherein said lever arm defines a longitudinal axis oriented substantially perpendicular to said pivot axis, said lever arm defining a first longitudinal distance between said pivot axis and an area of contact between said cam member and said second portion of said lever arm, said lever arm defining a second longitudinal distance between said pivot axis and an area of contact between said spring and said first portion of said lever arm, said first longitudinal distance being greater than said second longitudinal distance.

5. The cart of claim 4, wherein said first longitudinal distance is at least twice said second longitudinal distance.

6. The cart of claim 1, wherein said cart has a first pair of said wheels disposed toward a forward end of said frame and a second pair of said wheels disposed toward a rearward end of said frame, one of said pair of wheels being non-swivelable, said brake mechanism being associated with at least one wheel of said non-swivelable pair of wheels.

7. The cart of claim 1, wherein said actuator includes an actuation handle pivotally mounted to said frame, said actuation handle being operatively coupled to said cam member by a cable, and wherein pivoting said actuation handle toward an activated position exerts a force onto said cable and imparts said rotational movement to said cam member.

8. The cart of claim 7, wherein said cart includes a cart handle mounted to a side portion of said frame to enable manual manipulation of said cart by an operator, said cart handle and said actuation handle each having graspable portions positioned in a substantially parallel arrangement and placed in close proximity when said actuation handle is pivoted to said activated position to allow said operator to simultaneously grasp said cart handle and said actuation bar and selectively maintain said actuation handle in said activated position.

9. The cart of claim 1, wherein said first portion of said lever arm includes a brake pad configured to frictionally engage a circumferential surface of said one of said wheels when said lever arm is in said braked position to inhibit rotation of said one of said wheels.

10. The cart of claim 1, wherein said cam member has an eccentric shape to translate said rotational movement of said cam member into said pivotal movement of said lever arm.

11. The cart of claim 1, wherein said cam member is operably coupled to a shaft defining a longitudinal axis, said shaft being rotatably coupled to said cart, and wherein said actuation of said actuator rotates said shaft about said longitudinal axis and engages said cam member against said second portion of said lever arm.

12. The cart of claim 11, further comprising a second brake mechanism and a second brake release mechanism, each being associated with another of said wheels.

13. The cart of claim 11, wherein said pivot axis of said lever arm and said longitudinal axis of said shaft are positioned substantially parallel.

14. A brake system for a movable cart having a plurality of wheels rotatably attached thereto, comprising:
    a rocker arm rockably mounted to said cart, said rocker arm having a braking surface disposed adjacent one of said wheels;
    a biasing member engaging said rocker arm and urging said braking surface into engagement with said one of said wheels to inhibit rotation thereof;
    a cam member rotatably mounted to an underside of said cart and being disposed adjacent an outwardly facing bearing surface of said rocker arm;
    an actuator handle attached to said cart and being operatively coupled to said cam member; and
    wherein actuation of said actuator handle rotates said cam member and compresses said cam member against said outwardly facing bearing surface of said rocker arm to impart rocking movement to said rocker arm, said rocking movement disengaging said braking surface from said one of said wheels to permit rotation thereof.

15. The brake system of claim 14, wherein said biasing member is a resilient member engaged between said cart and said rocker arm, said resilient member being elastically deformed during said actuation of said actuator handle.

16. The brake system of claim 15, wherein said resilient member is a spring disposed between an underside of said cart and an upper side of said rocker arm, said actuation of said actuator handle compressing said spring, said spring re-engaging said braking surface against said one of said wheels upon deactuation of said actuator handle.

17. The brake system of claim 14, wherein said cam member is operably coupled to a shaft defining a longitudinal axis, said shaft being rotatably mounted to said cart and operably coupled to said actuator handle, and wherein said actuation of said actuator handle rotates said shaft about said longitudinal axis and engages said cam member against said bearing surface of said rocker arm.

18. The brake system of claim 17, wherein said shaft includes a torque arm extending therefrom in a direction transverse to said longitudinal axis, said actuator handle being pivotally coupled to said cart and connected to said torque arm by a cable, and wherein pivoting of said actuator handle toward an activated position exerts a force onto said cable and correspondingly rotates said shaft about said longitudinal axis.

19. The brake system of claim 18, wherein said cart includes a cart handle to enable manual manipulation of said cart by an operator, said cart handle and said actuator handle each having graspable portions disposed in a substantially parallel arrangement, said graspable portions being placed in close proximity when said actuator handle is pivoted to said activated position to allow said operator to simultaneously grasp said graspable portions and selectively maintain said actuator handle in said activated position.

20. The brake system of claim 17, further comprising:
   a second rocker arm rockably mounted to said cart, said second rocker arm having a second braking surface disposed adjacent another of said wheels;
   a second biasing member engaging said second rocker arm and urging said second braking surface into engagement with said another of said wheels to inhibit rotation thereof;
   a second cam member operably coupled to said shaft and being disposed adjacent a second outwardly facing bearing surface of said second rocker arm; and
   wherein said actuation of said actuator handle rotates said shaft about said longitudinal axis and compresses said second cam member against said second outwardly facing bearing surface of said second rocker arm to impart rocking movement to said second rocker arm, said rocking movement disengaging said second braking surface from said another of said wheels to permit rotation thereof.

21. The brake system of claim 14, wherein said rocker arm includes a brake pad defining said braking surface, said braking surface being configured to frictionally engage a periphery of said one of said wheels to inhibit rotation thereof.

22. The brake system of claim 21, wherein said braking surface is configured to tangentially engage a circumferential surface of said one of said wheels to inhibit rotation thereof.

23. The brake system of claim 14, wherein said cam member and said rocker arm are mounted to an underside of said cart by a unitary mounting bracket.

24. A brake system for a movable cart having a plurality of wheels rotatably attached thereto, comprising:
   a lever arm pivotally coupled to said cart;
   means for biasing said lever arm toward a first operational position wherein a portion of said lever arm is engaged against one of said wheels to inhibit rotation thereof; and
   means for pivoting said lever arm toward a second operational position wherein said portion of said lever arm is disengaged from said one of said wheels to permit rotation thereof, said means for pivoting comprising:
      a single-piece cam member rotatably coupled to an underside of said cart, said single-piece cam member being compressed against an outwardly facing surface of said lever arm upon rotation of said cam member to pivot said lever arm toward said second operational position;
      a shaft rotatably coupled to said underside of said cart, said single piece cam member being coupled to said shaft; and
   means for imparting rotational movement to said shaft.

* * * * *